United States Patent [19]

Smyres et al.

[11] 4,410,496

[45] Oct. 18, 1983

[54] RECOVERY OF METAL VALUES FROM COMPLEX SULFIDES

[75] Inventors: Gary A. Smyres, Sparks; Philip R. Haskett, Reno, both of Nev.

[73] Assignee: The United States of America as represented by the Secretary of the Interior, Washington, D.C.

[21] Appl. No.: 376,065

[22] Filed: May 7, 1982

[51] Int. Cl.³ .................... C01G 3/05; C01G 21/16; C01G 9/04
[52] U.S. Cl. .......................................... 423/1; 423/39; 423/98; 423/109
[58] Field of Search .............. 423/38, 27, 98, 109, 423/39, 1, 40; 75/114, 101 R, 117, 25

[56] References Cited

U.S. PATENT DOCUMENTS

| | | | |
|---|---|---|---|
| 1,011,562 | 12/1911 | Bradley | 423/35 |
| 1,736,659 | 11/1929 | Mitchell | 423/36 |
| 3,981,962 | 9/1976 | Smyres et al. | 423/35 |
| 4,013,456 | 3/1977 | Bergsoe | 75/25 |
| 4,113,471 | 9/1978 | Langhorst et al. | 75/114 |

*Primary Examiner*—O. R. Vertiz
*Assistant Examiner*—Robert L. Stoll
*Attorney, Agent, or Firm*—William S. Brown

[57] ABSTRACT

Metal values, such as copper, lead and zinc, are recovered from complex sulfides, e.g., ores or smelter flue dusts, by means of aqueous leaching in the presence of oxygen and $CaCl_2$ or $BaCl_2$ at elevated temperature.

3 Claims, No Drawings

RECOVERY OF METAL VALUES FROM COMPLEX SULFIDES

Recovery of metal values from complex sulfides, such as ores or concentrates, has conventionally been accomplished by means of roasting and smelting operations. Such operations are, however, costly, as well as presenting severe pollution problems. More recently, hydrometallurgical procedures such as those disclosed in U.S. Pat. Nos. 3,981,962 and 4,053,305, have been employed. These twelve aqueous leaching of ores or concentrates in the presence of a combination of oxygen and gaseous chlorine or ferrous chloride, respectively. These procedures, however, result in undesirable concentrations of sulfate ion in the leach solution. As discussed in said U.S. Pat. No. 3,981,962, this may be prevented by addition of calcium or barium chloride before or after leaching, whereby the major proportion of the sulfate is precipitated as the calcium or barium salt. Low concentrations of sulfate ion in the leach solution are highly desirable in order to prevent formation of jerosites which can substantially reduce recovery of desired metal values. Moreover, continued buildup of sulfate may eventually result in salting out problems.

It has now been found, according to the invention, that metal values such as copper, lead and zinc may be efficiently extracted from sulfide minerals or concentrates, or from wastes, e.g., smelter flue dusts, by means of aqueous leaching of the ore, concentrate or waste in the presence of a combination of oxygen and calcium or barium chlorides. By this means, a sufficient concentration of chloride is readily provided for efficient extraction of metal values, without the necessity of the use of gaseous chlorine. Use of the chloride salts is generally far more convenient and less costly than handling and storage of gaseous chlorine. In addition, the calcium or barium cations serve the important purification function of providing a low concentration of sulfate ion in the pregnant leach solution.

The feed materials in the process of the invention will comprise complex sulfides of metals such as copper, lead and zinc, and frequently lesser amounts of arsenic, antimony, iron, silver or gold. The feed is initially ground to a suitable particle size, e.g., about minus 65 mesh, and is then slurried with a solution of $CaCl_2$ or $BaCl_2$ is an amount sufficient to provide a pulp density of about 20 to 60 percent. Suitable concentrations of the $CaCl_2$ and $BaCl_2$ solutions will generally be in the range of about 10 to 30 percent. However, optimum concentrations, as well as pulp densities of the slurries, may vary widely with different feed materials and are best determined experimentally.

The slurry is placed in a closed reactor and oxygen added, with mechanical agitation, at a controlled rate to cause the temperature to rise to the desired operating value. Suitable temperatures may range from about 80° to 150° C., although about 110° C. is preferred since higher temperatures tend to increase sulfate formation. Reaction pressures may range from about 20 to 300 psig oxygen, or air pressures sufficient to give this range of oxygen partial pressure. Leach time required may vary widely with different feed materials and reaction conditions, e.g., times of 1 to 24 hours have been used.

After completion of the reaction, the mixture is cooled to room temperature, filtered and washed with water. Major amounts of copper, lead and zinc are solubilized during the leaching reactions, with other metal values remaining largely in the residue. Copper is readily recovered from the filtrate by solvent extraction or by cementation with iron, e.g., by addition of shredded iron cans. Recovery of zinc is conveniently by means of aqueous or fused salt electrolysis, while lead may be recovered by means of fused salt electrolysis.

The invention will be more specifically illustrated by the following examples.

EXAMPLE 1

Fifty grams of a sulfide ore containing 0.6 percent Cu, 2.6 percent Pb, 4.6 percent Zn, 35 percent Fe, 37 percent S, and 7 oz/ton of Ag, was treated in a closed reactor with 20 grams of $CaCl_2$ and 100 grams of water. The reaction was carried out at 100° C. and 60 psig $O_2$ for 20 hours, and resulted in solubilization of 75 percent of the Cu, 71 percent of the Pb, 67 percent of the Ag and 96 percent of the Zn. Ninety percent of both iron and total sulfate remained in the residue.

EXAMPLE 2

Fifty grams of a smelter flue dust containing 7.5 percent Cu, 24 percent Pb, 5 percent Zn, 4 percent Fe, and 9.5 percent sulfur was treated in a closed reactor with 20 grams of $CaCl_2$ and 100 grams of water at 100° C. and 50 psig $O_2$ for 20 hours. Recoveries (solubilization) were: Cu, 91 percent; Pb, 77 percent and Zn, 65 percent, while 98 percent of the iron and 97.5 percent of the sulfate reported to the residue.

EXAMPLE 3

A test similar to example 2 was run, except that 33.1 grams of $BaCl_2$ was employed in place of the $CaCl_2$ of the previous example. Recoveries were: Cu, 91 perecent; Pb, 82 percent; Zn, 77 percent, with 99 percent of the iron and 78 percent of the sulfate remaining in the residue.

We claim:

1. A process for recovery of metal values from complex sulfide ores or concentrates comprising treating a slurry of the ores and concentrates in an aqueous solution consisting essentially of calcium chloride or barium chloride with gaseous oxygen at a temperature of about 80° to 150° C., the amount of the calcium or barium chloride being sufficient to provide a chloride concentration sufficient for efficient extraction of metal values.

2. The process of claim 1 in which the metal values comprise copper, lead and zinc.

3. The process of claim 1 in which the temperature is about 110° C.

* * * * *